United States Patent Office 3,084,250
Patented Apr. 2, 1963

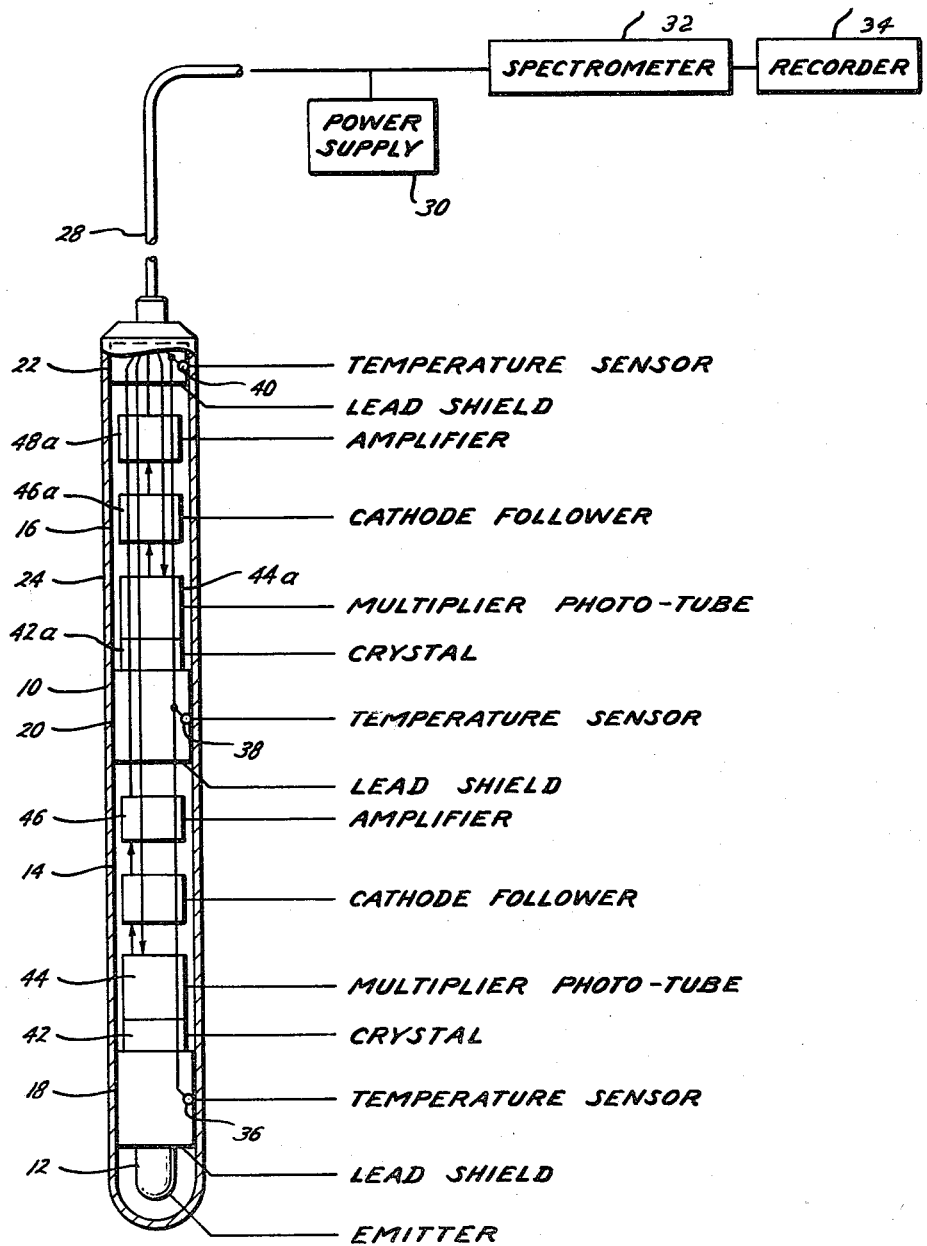

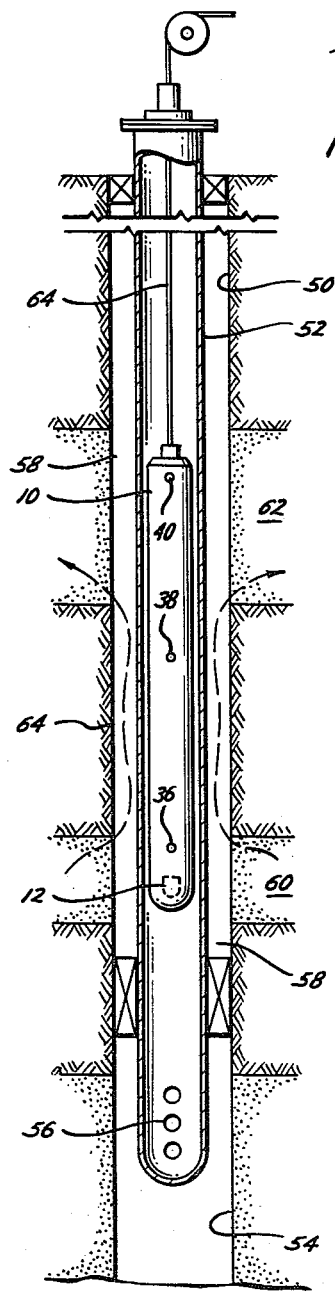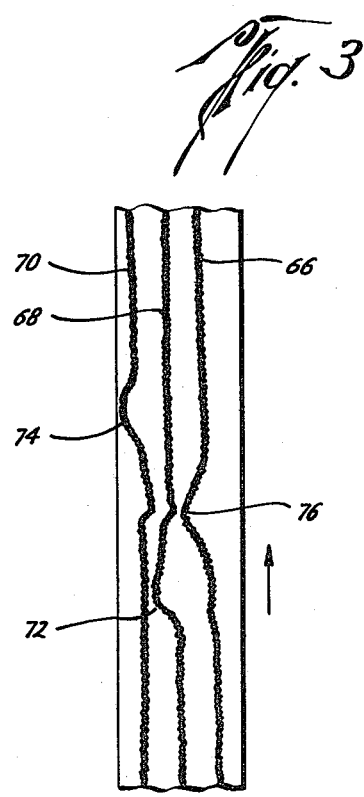

3,084,250
MATERIAL FLOW DETECTOR AND METHOD
Roderick A. Dennis, Houston, Tex., assignor to Research & Aviation Development, Inc., Houston, Tex., a corporation of Texas
Filed Nov. 24, 1959, Ser. No. 855,079
7 Claims. (Cl. 250—43.5)

The present invention relates to an apparatus for and a method of detecting the movement of material, and more particularly relates to such apparatus and method in which the movement, direction of movement, quantity of flow, and rate of flow of a material may be detected and measured.

The present invention is directed toward causing a portion of the material to become radioactive and then detecting the movement of the activated portion and the present invention can be used to detect and measure the rate, quantity and direction of material flow in pipes, containers and in other applications and can be used with liquids, gases, and solids.

It is an object of this invention to provide an apparatus for and a method of detecting material flow and the rate and quantity of such flow by remote detecting and measuring means so that actual physical contact with the material to be detected and measured is not required.

A further object of the present invention is to provide a method of detecting material flow and to provide an apparatus for measuring said material flow in which elements of the material are made radioactive and the movement and rate of movement of these activated elements are detected and measured.

Still a further object of the present invention is the provision of a method of detecting and measuring material flow and a material detector in which a neutron emitter is provided to activate elements in a certain portion of the material and a radiation detector is used to measure the movement and rate of flow of the activated elements.

Still a further object of the present invention is the provision of a method of detecting and measuring material flow and for providing an apparatus for detecting and measuring the material flow in which a neutron emitter is positioned adjacent the material thereby activating elements in the material and causing them to become radioactive, placing a shield adjacent the emitter thereby directing and controlling the direction of emission from the emitter and thus controlling the part of the material which is activated, and a detector is shielded from the emitter and detects the activated elements in the material if they move.

Yet a still further object of the present invention is the provision of an apparatus for detecting and measuring the rate of material flow which includes a neutron emitter for activating elements in the material and causing them to be radioactive, a shield adjacent the emitter thereby directing and controlling the emission of said emitter and thus controlling which part of the material is activated, and two detectors positioned at spaced points adjacent the activated material and out of the direction of emission from the emitter thereby detecting the activated elements in the material as they pass by the detectors and thus detecting and measuring the rate of material flow.

Yet a further object of this invention is the provision of a method of detecting and measuring the rate of material flow by radioactively energizing elements in a portion of the material thereby causing the elements to be radioactive for short periods of time, and detecting these radioactive elements in the material as they pass by spaced points removed from the activated portions of the material thereby detecting the material flow and the rate of such flow.

Other and further objects, features and advantages will be apparent from the following description of a presently preferred embodiment and method of invention, given for the purpose of disclosure, and taken in conjunction with the accompanying drawings, where like character references designate like parts throughout the several views, and where FIGURE 1 is an elevational view, partly in section, and partly diagrammatic, illustrating an apparatus according to the invention, FIGURE 2 is an elevational view, partly in section, illustrating an apparatus according to the invention in its use as detecting oil leakage in a production oil well, and FIGURE 3 is an elevational view illustrating a chart showing the recordation measurements made by the apparatus of the present invention.

For the purposes of example and illustration only the present invention is shown herein in its application to the detection and measurement of an underground oil liquid leak. It is to be understood however that the invention is capable of many and various uses in connection with the detection of and measurement of flow of liquids, gas and solids.

Referring now to the drawings, and particularly to FIGURE 1, the reference numeral 10 generally designates the material detector of the present invention which generally includes a neutron emitter 12 which by radioactivity activates atoms in adjacent material causing them to be radioactive, detectors 14 and 16 for detection of movement of the activated materials, and shields 18, 20 and 22 which direct and control the direction of emission from the emitter 12 and the direction of detection of the detectors 14 and 16.

Preferably the emitter 12, detectors 14 and 16, and shields 18, 20, and 22 are encased in a probe body 24. A suitable electric cable 28 is connected to these components to supply the required power from power supply 30 and to transmit the detected and measured data to the spectrometer 32 and a recorder 34. Also temperature sensor elements 36, 38, and 40 are provided along the probe body 24 to indicate temperature gradient and possible temperature changes due to gas expansion.

In order to activate elements in the fluid for tracing purposes any suitable neutron emitter 12 may be used. Any suitable neutron emitter may be used, preferably having a strong output, such as radium beryllium or antimony beryllium. Thus the neutron emitter 12 will emit neutrons and gamma ray pulses as directed by the shield 18 to elements in the material and the amount of neutron absorption by the elements in the material will vary depending upon the distance of the material from the emitter, the distance, the cross-sectional area, and the time of exposure. It is to be noted that while the instrument of the present invention may be inserted in a fluid stream the activation and detection may occur when the instrument 10 is outside of the fluid or material to be detected or measured. Thus the neutron emitter 12 activates the different types of atoms in the material so that they become radioactive and thus the elements in the material emit gamma radiation. Each of the various elements in the material that are activated emit a distinctive radiation so that each particular atom can be identified by its radiation pulse characteristics. The shield 18, which is made preferably of lead or other suitable materials, acts to shield the detectors 14 and 16 from direct radiation from the emitter 12 and also serves to control the direction of emission from the emitter to the material being sensed, here shown in FIGURE 1, as being emitted in a 180° or hemispherical direction.

Radiation detectors 14 and 16 are thus shielded from the direct gamma ray emission from the emitter 12 and detect radiation in the material which has become radioactive as this radioactive material moves in the field of detection of the detectors 14 and 16. While various types of radiation detection devices may be used, a scintillation counter has been found satisfactory which includes a crystal 42 which produces flashes of light in the presence of radioactivity, a photomultiplier tube 44 which receives the flashes of light from the crystal 42 and creates electrical impulses for each flash and amplifies this signal, and an amplifier 46 for further amplifying the detection signal. A suitable type of commercial detector which is available is the Mt. Sopris scintillation counter, Model No. SC-128 AA which is available from the Mt. Sopris Company of Boulder, Colorado. The detector 16 is similar to the detector 14 and includes crystal 42a, multiplier tube 44a, cathode follower 46a, and amplifier 48a.

Shield 20 is provided between detectors 14 and 16 and shield 22 is provided adjacent detector 16. These shields are preferably of lead or other suitable materials and together with shield 18 serve to limit the direction of detection of the detectors 14 and 16. Of course, various shaped shields may be used to control the direction of detection as desired. As shown in FIGURE 1, the detectors 14 and 16 will detect radiation from elements which are located in a transverse plane to each detector. Thus, the movement of radioactive material from adjacent the emitter 12 to a plane transverse to either of the detectors 14 or 16 can be detected. Furthermore, by measuring the time interval of detection of the movement of activated material between detectors 14 and 16 the rate of flow may be determined. Also, the quantity of flow may be estimated from the amount of radioactivity that is detected.

The power supply 30 supplies the necessary power requirements of the detectors 14 and 16. The spectrometer 32 is electrically connected to the detectors 14 and 16 and is used to analyze the radiation detected by the detectors and can identify the particular element that has emitted the detected pulses by the pulse rate and pulse width received. A satisfactory instrument is the NRD spectrometer, Model 2910 which is available from the NRD Instrument Company of St. Louis, Missouri. A recorder 34 may be connected to the spectrometer 32 and records the desired data as received from the detectors 16 and 18 which has been analyzed by the spectrometer 32.

Temperature sensors 36, 38, and 48 indicate the temperature gradient and can detect possible gas leakage due to gas expansion which causes a temperature drop.

It is to be noted that the above instrument will only detect the material flow if the flow is in a direction from the emitter toward the detectors 14 and 16. Of course, by providing two detectors similar to 14 and 16 on the other side of the emitter 12 from the detectors 14 and 16 along with similar shielding, the direction of movement in either direction as well as detection and rate of movement of the activated material can be determined.

Referring now to FIGURES 2 and 3 the operation and method of the present invention is seen in its use of the detecting oil well leakage due to a poor cement job. A conventional well bore 50 has production tubing 52 placed therein for receiving oil well production from production zone 54 through perforations 56 in the tubing. As is conventional this tubing is sealed by placing cement 58 between the well bore 50 and the production tubing 52. Assuming that the lower production sands 54 are properly cemented and assuming an upper production sand 60 which has been cemented off by the cement 58 is improperly cemented so as to lose production from zone 60 to an upper nonproductive sand 62 because of an improper cement job along section 64 of the well bore the usefulness of the present invention may be illustrated.

The difficulty of detecting any possible loss from the bypassed underground production zone 60 is obvious. However, the material detector 10 is lowered in the production tubing 52 by means of a cable 64 which includes power and control cable 28 (FIGURE 1) after the oil flow from casing 52 and the production zone 54 has been stopped. The neutron emitter 12 is stopped at the point to be inspected, here the bypass production zone 60 and the time required to activate the elements in the oil fluid in the production zone 60 is satisfied. It is to be noted that the emission from emitter 12 is directed out sideways and downwardly and not upwards because of the lead shield 18 (FIGURE 1) and thus does directly affect detectors 14 and 16. Of course, the direction of emission may be limited strictly to transverse radiation for measuring successive upstream portions of the fluid. Thus, the elements in the fluid in production zone 60 are activated and as they flow upwardly they are detected by detector 14 and also by detector 16. The use of one detector will confirm the fact that there is fluid leakage and the use of both detectors will determine the flow rate and an estimate of the quantity of the flow. If desired, the emitter 12 may be shielded for strictly transverse radiations and two additional detectors and their shields may be placed beneath the emitter 12 similarly to detectors 14 and 16 and thus insure that flow in either direction will be detected.

Temperature measurements are taken at the bottom, center and top of the apparatus 10 by temperature sensors 36, 38 and 40 to indicate temperature gradient with depth and possible temperature changes due to gas expansion which would cause heat absorption and a temperature drop and these temperature findings could be integrated with the detector recordings to correct for errors which might be caused by the temperature changes as the rate of emission of the emitter 12 varies with the temperature and increases when the temperature increases.

Referring now to FIGURE 1, the detectors 14 and 16 detect the activated materials in the oil fluids from production zone 60 which causes the crystals 42 and 42a to produce light pulses which vary in intensity and duration depending upon the type of element from which the radiation is received, and these flashes of light are transmitted to the photoelectric tubes 44 and 44a, respectively, then to the cathode followers 46 and 46a, respectively, and the signals are amplified by amplifiers 48 and 48a and then transmitted by suitable electric cables 28 to the spectrometer 32. The spectrometer 32 may if desired measure only the pulse rate and pulse height of a certain type of element and in the present case the activation and detection of the sodium atom is preferably measured and detected as this element has a very high energy level and a short half life of 15.06 hours. The detected information is passed from the spectrometer 32 to a recorder 34 and as shown in FIGURE 3 produces a recording where line 66 represents temperature, recording 68 represents the signal from the first detector 14, and recording 70 represents the data received from the second detector 16. Thus, the detector 14 shows on its indicating line at position 72 an increase in radiation which indicates detection of activated elements in the fluid and thereby denotes a leak. The increase 74 in the output from the detector 16 indicates detection of flow by that detector. And the interval of time between the detection of the radiation by detectors 14 and 16 is an indication of the rate of flow or leakage. If in addition to flow of oil from production zone 60 there is a flow of gas there would be a temperature drop due to this gas leak because of the expansion of the gas. This would be indicated at 76 on the temperature curve 66.

Thus the present invention provides an apparatus for and a method of detecting material flow without the need of being in physical contact with the material.

It is believed that the method of the invention is apparent from the foregoing description of a presently preferred apparatus of the invention. The method, however, comprises the steps of radioactivating elements in the material whose presence or rate of flow is desired to be detected and measured, and detecting the movement of these radioactive elements. The method also comprehends placing a neutron emitter adjacent the material to be detected and whose rate and quantity of flow is desired to be measured, limiting the direction of emission from the emitter so as to activate a desired portion of the material, and placing two radiation detectors at spaced points removed from the portion of material activated and detecting and measuring the movement, quantity, and rate of flow of the activated elements.

The present invention, therefore, is well adapted to carry out the objects and attain the ends and advantages mentioned as well as others inherent therein. While a presently preferred embodiment of the invention is given for the purpose of disclosure, numerous changes in the details of construction, and arrangement of parts and steps of the process may be made which will readily suggest themselves to those skilled in the art and which are encompassed within the spirit of the invention and the scope of the appended claims.

What is claimed is:

1. An apparatus for detecting material and rate of flow of said material comprising, a neutron emitter adapted to be positioned adjacent said material thereby activating elements in said material and causing said elements to become radioactive, a first directional shielding means positioned adjacent said emitter controlling the direction of emission from said emitter, a first and second detector means positioned on one side of said first shield means remote from said emitter for detecting the radioactive elements in said material, a second directional shielding means positioned between said first and second detector, said first and second shielding means limiting the direction of detection of said first and second detector means, and timing means electrically connected to said first and second detectors whereby the rate of flow of said material between said first and second detector means can be measured.

2. The invention of claim 1 including a third directional shielding means adjacent said second detector further limiting the direction of detection of said second detection means.

3. The invention of claim 1 including a spectrometer electrically connected to said first and second detector means thereby measuring the quantity and nature of the detected radioactive elements in said material.

4. An apparatus for detecting the presence and rate of material flow comprising an elongate supporting structure, a neutron emitter connected to said support, a first directional shielding means adjacent said emitter and connected to said support controlling the direction of emission from said emitter, a first and second detector means positioned on a side of said first shielding means remote from said emitter whereby said first and second detector means are shielded from said emitter, a second directional shielding means positioned between said first and second detector means, and a third directional shielding means positioned adjacent said second detector means, all of said shielding means limiting the direction of detection of said detectors whereby as radioactive elements in said material pass between said first and second detectors the presence of said elements is detected, and timing means connected to said first and second detectors for measuring the time interval between the detection of said radioactive elements by said first and second detectors whereby the rate of flow of said material is measured.

5. The invention of claim 4 including at least one temperature measuring means connected to said support for measuring the temperature in a well bore.

6. An apparatus for detecting material flow, quantity and rate of flow comprising, a neutron emitter adapted to be positioned adjacent said material thereby activating elements in said material and causing said elements to become radioactive, directional shielding means positioned adjacent said emitter and limiting the direction of emission from said emitter into said material, first and second radiation intensity detector means positioned on one side of said shielding means remote from said emitter for detecting the activated radioactive elements in said material, transverse directing shielding means positioned on each side of said first and second detectors limiting the direction of detection of said first and second detectors in a transverse direction, and timing means electrically connected to said first and second detectors whereby the quantity, and rate of flow of said material between said first and second detector means can be measured.

7. The invention of claim 1 including at least one temperature measuring means connected to said apparatus for measuring the temperature in a well bore.

References Cited in the file of this patent

UNITED STATES PATENTS

| | | |
|---|---|---|
| Re. 24,383 | McKay | Oct. 29, 1957 |
| 2,640,936 | Pajes | June 2, 1953 |
| 2,869,642 | McKay et al. | Jan. 20, 1959 |